United States Patent
Sato et al.

(10) Patent No.: US 9,067,823 B2
(45) Date of Patent: Jun. 30, 2015

(54) SYNTHETIC SILICA GLASS, ESPECIALLY FOR THE CLADDING OF AN OPTICAL FIBER AND A MANUFACTURING METHOD FOR THE SYNTHETIC SILICA GLASS

(75) Inventors: Tatsuhiro Sato, Koriyama (JP); Tomoichi Kumata, Koriyama (JP)

(73) Assignees: Heraeus Quarzglas GmbH & Co. KG, Hanau (DE); Shin-Etsu Quartz Products Co., Ltd, Tokyo (JP)

( * ) Notice: Subject to any disclaimer, the term of this patent is extended or adjusted under 35 U.S.C. 154(b) by 1056 days.

(21) Appl. No.: 13/091,049

(22) Filed: Apr. 20, 2011

(65) Prior Publication Data

US 2012/0269711 A1    Oct. 25, 2012

(51) Int. Cl.
  C03C 3/06    (2006.01)
  C03C 25/10   (2006.01)

(52) U.S. Cl.
  CPC .......... C03C 25/107 (2013.01); *C03C 2201/32* (2013.01)

(58) Field of Classification Search
  CPC ................. C03C 2201/30; C03C 2201/32
  USPC .................................................. 501/54
  See application file for complete search history.

(56) References Cited

U.S. PATENT DOCUMENTS

| | | | | |
|---|---|---|---|---|
| 5,262,365 | A * | 11/1993 | Oyobe et al. | 501/54 |
| 5,330,941 | A * | 7/1994  | Yaba et al.  | 501/54 |
| 6,136,736 | A * | 10/2000 | Rajaram et al. | 501/54 |
| 6,235,669 | B1 * | 5/2001 | Antczak et al. | 501/133 |

(Continued)

FOREIGN PATENT DOCUMENTS

| | | |
|---|---|---|
| JP | 2005 067913 A | 3/2005 |
| JP | 2005 239474 A | 9/2005 |

(Continued)

OTHER PUBLICATIONS

Espacenet English language abstract of JP 2009078928 (A) published Apr. 16, 2009.

(Continued)

*Primary Examiner* — Noah Wiese
(74) *Attorney, Agent, or Firm* — Tiajoloff & Kelly LLP

(57) ABSTRACT

It is an object of the invention to provide a synthetic silica glass for a cladding of a core from a fiber laser. The refractive index should be low and there should be no foaming foreign substances. This object is achieved by a synthetic silica glass for an optical element, which contains paramagnetic E' defect centers in an amount that is sufficient to set the absorption coefficient at 215 nm is in the range between 0.001 cm$^{-1}$ and 2 cm$^{-1}$; it contains paramagnetic oxygen defect centers in an amount that is sufficient to set the absorption coefficient at 250 nm is in the range between 0.001 cm$^{-1}$ and 2 cm$^{-1}$; the OH group concentration is 5 wtppm or less; the viscosity at 1100° C. is in the range between $1\times10^{13.5}$ poise and $1\times10^{15.5}$; the total content of metallic elements of Group 3 and Group 13 of the periodic table is 50.000 wtppm or less; and the relative refractive index difference of said synthetic silica glass is in the range between +0.03 % to +3 %, in relation to a synthetic fused silica glass with the absorption coefficient at 215 nm being less than 0.001 cm$^{-1}$, the absorption coefficient at 250 nm being less than 0.001 cm$^{-1}$, and the total concentration of the metallic elements contained being 1 wtppm or less, in the wavelength range of 600 nm or more and 1700 nm or less.

6 Claims, 2 Drawing Sheets

(56) References Cited

U.S. PATENT DOCUMENTS

| | | | |
|---|---|---|---|
| 7,002,298 B2 * | 2/2006 | Fukushima | 313/634 |
| 2010/0091360 A1 * | 4/2010 | Kuehn et al. | 359/355 |

FOREIGN PATENT DOCUMENTS

| | | |
|---|---|---|
| JP | 2009078928 A | 4/2009 |
| JP | 2009 298686 A | 12/2009 |
| JP | 2011 088788 A | 5/2011 |

OTHER PUBLICATIONS

Espacenet English language abstract of JP 2011 088788 (A) published May 6, 2011.
Espacenet English language abstract of JP 2009 298686 (A) published Dec. 24, 2009.
Espacenet English language abstract of JP 2005 239474 (A) published Sep. 8, 2005.
Espacenet English language abstract of JP 2005 067913 (A) published Mar. 17, 2005.

* cited by examiner

SYNTHETIC SILICA GLASS, ESPECIALLY FOR THE CLADDING OF AN OPTICAL FIBER AND A MANUFACTURING METHOD FOR THE SYNTHETIC SILICA GLASS

TECHNICAL FIELD

The present invention relates to a synthetic silica glass that is preferably used for the cladding of an optical fiber, especially a fiber that is used for a fiber laser.

Furthermore, the invention refers to a manufacturing method for the synthetic silica glass.

BACKGROUND ART

Not only is a synthetic silica glass transparent over a broad range of wavelengths from infrared light to vacuum ultraviolet rays, it is excellent in thermal stability and chemical stability, and is also widely used for optical fibers for communication and for fibers for laser oscillation (in the following also referred to as "fiber laser"). Compared to a bulk laser, the fiber laser has many advantageous aspects such as stability of the laser oscillation and being able to reduce the size of equipment, and increasing attention is being paid to it.

The fiber laser contains dopants such as Al or rare earth elements, for example Er or Yb, in a core section to a percentage level, and provides a laser oscillation function (as disclosed for example in Japanese Unexamined Patent Application Publication 2009-78928)). Excited light that is transmitted through the core section is amplified and oscillated at a fiber end. A cladding is formed around the core so that the excited light does not diffuse outside the fiber. At that time, a refractive index of the cladding is set lower than the refractive index of the core such that light facing outward from the core is not inclined and diffused outward.

With regard to a laser oscillation output, year by year, there is a tendency that a high output is required, and the concentration of metallic elements that are doped in order to intensify the intensity of excited light has also become higher. When the doping metal concentration of the core section increases, the refractive index increases. Therefore, in order to keep the inclination angle at an appropriate level, it is also necessary to increase the refractive index of the cladding.

The refractive index is dependent on electron density; therefore, the greater the electron density, the greater the refractive index. When there is electrical non-uniformity in a silica glass, the refractive index increases correspondingly. For example, the metallic elements of Group 3 or 13 that are doped in the silica glass easily carry electrical charges, and are known as refractive index enhancement element. However, simply by doping the metallic elements, the doping concentration was required to be maintained up to the percentage level, there were numerous problems in the manufacturing method and resulting glass quality, and particularly, there was a huge problem with high doping to the synthetic silica glass. Specifically, when the metallic elements were doped to the percentage level in order to increase the refractive index of the cladding to a desired level, for a doped synthetic silica glass for cladding, foams and bubbles are generated and other foreign substances occur, and after drawing of the fiber, the breaking strength deteriorated significantly, such as causing multiple fractures, and furthermore, optical degradation such as photodarkening occurred; therefore, there were many technical problems.

Problems to be Solved by the Invention

The present invention is intended to provide a synthetic silica glass, especially for cladding of a core that is used for a fiber laser, in which despite a high refractive index the dopant load is low, so that there are no bubbles or foaming foreign substances, and optical stability is high.

Furthermore, it is an object of the invention to provide a manufacturing method thereof.

Means for Solving the Problems

In order to solve the above problems, the present inventor discovered that by setting the paramagnetic defects, namely Si'•(in the following referred to as "E' center") that is expressed as the absorption band of 215 nm, and the defect volume of the oxygen-deficient-type defect of Si—Si (in the following referred to as "ODC defect center") that is expressed as the absorption band of 250 nm so as to have a desired range. Furthermore, by setting the OH group concentration to 5 wtppm or less, and by setting the viscosity in a desired range.

It was found that under these circumstances the concentration of the doped metals for increasing the refractive index could be significantly low or even zero. By setting the above mentioned paramagnetic defects it is possible to obtain a synthetic silica glass with the refractive index being 0.03% to 3% higher in the relative refractive index difference, with respect to conventional non-doped synthetic silica glass.

That is, a synthetic silica glass for cladding of the present invention is a synthetic silica glass for an optical component, and has the absorption coefficient at 215 nm of 0.001 $cm^{-1}$ or more and 2 $cm^{-1}$ or less, the absorption coefficient at 250 nm of 0.001 $cm^{-1}$ or more and 2 $cm^{-1}$ or less, the OH group concentration of 5 wtppm or less, the viscosity at 1100° C. of $1\times10^{13.5}$ poise or more and $1\times10^{15.5}$ poise or less, the total content of metallic elements of Group 3 and Group 13 of the periodic table of 50.000 wtppm or less, and the relative refractive index difference of the synthetic silica glass for cladding when based on a synthetic fused silica glass with the absorption coefficient at 215 nm being less than 0.001 $cm^{-1}$, the absorption coefficient at 250 nm being less than 0.001 $cm^{-1}$, and the total concentration of the metallic elements contained being 1 wtppm or less, in the wavelength range of 600 nm or more and 1700 nm or less, is +0.03% to +3%.

It is preferable that the synthetic silica glass for cladding of the present invention contains a total of 1 wtppm or more and 10.000 wtppm or less, particularly preferred 1.000 wtppm or less, of one type or more of the metallic elements selected from a group constituted from Group 3 and Group 13 of the periodic table.

Surprisingly, it was found that the above mentioned paramagnetic defects seem to enhance the capability of the synthetic silc glass for incorporation high amounts of doping elements without generating of bubbles and foams. It was possible to incorporate high levels up to 50.000 wtppm of the metallic elements from Group 3 and Group 13 of the periodic table without negatively affecting the glass structure. It may be that incorporation of even higher concentrations of such doping elements is possible. On the other hand, since the above mentioned paramagnetic defects themselves enhance the refractive index, so that in a cladding material for a laser, where said doping elements have no effect relating to the laser efficiency, the concentration of doping elements that are used just for enhancing the refractive index of the quartz glass can be reduced according to the contribution of the refractive index enhancement caused by said paramagnetic defects. With regard to this it is a special advantage of the present invention that the doping concentration can be maintained at a lower level as it would be possible without the refractive index enhancing effect of said paramagnetic defects.

It is preferable that the abovementioned metallic element is Al.

A manufacturing method of the synthetic silica glass for an optical component of the present invention is a method for manufacturing the synthetic silica glass of the present invention, and comprises a process (a) of reduction treatment to heat a porous synthetic silica glass body in an atmosphere having reducibility at a first temperature; a process (b) for heat-treating in an atmosphere containing hydrogen, after the (a) process at a second temperature which is higher than the first temperature; and a process (c) for forming a sintered and densified silica glass body, after the (b) step.

It is preferable that the atmosphere having the reducibility is the reducing atmosphere containing a volatile organic silicon compound.

The synthetic silica glass for fiber of the present invention has the absorption coefficient at 215 nm of 0.001 $cm^{-1}$ or more and 2 $cm^{-1}$ or less, the absorption coefficient at 250 nm of 0.001 $cm^{-1}$ or more and 2 $cm^{-1}$ or less, the OH group concentration of 5 wtppm or less, the viscosity at 1100° C. of $1\times10^{13.5}$ poise or more and $1\times10^{15.5}$ poise or less, the total content of metallic elements of Group 3 and Group 13 of the periodic table of 50.000 wtppm or less, preferably 10.000 wtppm or less, and the relative refractive index difference of the synthetic silica glass for cladding when based on a synthetic fused silica glass with the absorption coefficient at 215 nm being less than 0.001 $cm^{-1}$, the absorption coefficient at 250 nm being less than 0.001 $cm^{-1}$, and the total concentration of the metallic elements contained being 1 wtppm or less, in the wavelength range of 600 nm or more and 1700 nm or less, is +0.03% to +3%.

The synthetic silica glass of the present invention is especially suitable for a use for manufacturing of the cladding of a fiber that is used for a fiber laser.

The fiber laser comprises a core glass and a cladding glass surrounding the core glass. If the core glass contains a high level of dopants for amplification reasons, it may become necessary that also the cladding glass contains a certain amount of dopants in order to maintain the refractive index difference between core glass and cladding glass in a predetermined range. Since the paramagnetic defects themselves cause a increase of the refractive index, a additional doping of the cladding glass for increasing the refractive index may be some superfluous or the level of doping element concentration may be less than it would be necessary without said paramagnetic defects.

Furthermore, the synthetic silica glass of the present invention is especially suitable for manufacturing of a fiber laser preform.

The synthetic silica glass exists as semifinished product in form of a rod or a tube for making the preform.

Furthermore, the synthetic silica glass of the present invention is especially suitable for manufacturing a fiber laser device.

The synthetic silica glass exists as semifinished product in form of a plate or a mirror for making the device.

Furthermore, the synthetic silica glass of the present invention is especially suitable for manufacturing a core glass for a preform for a step index optical fiber.

A step index optical fiber—not necessarily a laser fiber—is characterized by a radial refractive index profile which showing a step between the core glass and the cladding glass surrounding the core glass. The core glass of such optical fibers often contains germanium dioxide or other doping elements which are suitable for increasing the refractive index of quartz glass. However, germanium dioxide as well as other doping substances tends to diffuse at high temperatures—e.g. during fiber drawing of a preform comprising the core glass and the cladding glass. This diffusion causes a flattening of the pre-established radial index profile which adversely affects the light guiding properties of the resulting optical fiber.

According to the present invention, the core of an optical fiber is made from synthetic quartz glass which contains in a pre-determined amount the above mentioned paramagnetic defects. These defects cause an increase of the refractive index of the core glass similar as doping elements do. But in contrast to doping elements those paramagnetic defect do not diffuse within the quartz glass in any remarkable degree. Therefore, it easier to lead over the pre-established radial index profile of the preform to the fiber during fiber drawing.

Effect of the Invention

According to the synthetic silica glass for cladding and the synthetic silica glass for fiber of the present invention, without using the doped metals for increasing the refractive index or with significantly low concentration of doping, it is possible to obtain a synthetic silica glass with the refractive index being 0.03% to 3% higher in the relative refractive index difference, with respect to conventional non-doped synthetic silica glass. For the synthetic silica glass for cladding and the synthetic silica glass for fiber of the present invention, there are no foaming foreign substances, there are no fiber-shaped fractures, they have excellent optical stability and thermostability, and the refractive index in the wavelength range of 600 nm to 1700 nm can be adjusted 0.03% to 3% higher than conventional non-doped synthetic silica glass; therefore, it is most suitable for cladding of the fiber laser in which the refractive index of the core is high, but it can also be used as a core material for non-laser applications having an increased refractive index.

Based on the manufacturing method of the present invention, the synthetic silica glass for cladding of the present invention can be easily manufactured. Based on the fiber laser preform of the present invention, an optical fiber with high yield and with good optical amplification efficiency can be obtained.

MODE FOR CARRYING OUT THE INVENTION

Figure 1:
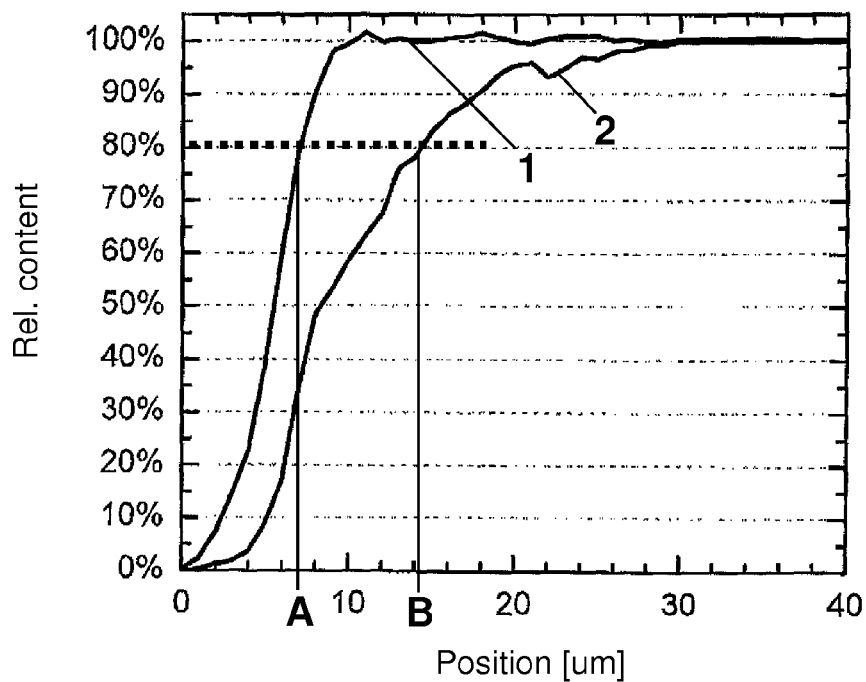
[FIG. 1] is a graph showing the results of measurement of the refractive index of Examples 1 to 3 and Comparison Examples 1 and 2.

Although detailed explanation is provided below along with Examples, they are for illustrative purposes and as long as they do not deviate from the technological thoughts of the present invention, obviously various modifications can be made.

The synthetic silica glass of the present invention is the one in which the refractive index is increased by setting the paramagnetic defect, namely E' center that is expressed as the absorption band of 215 nm and the defect volume of the oxygen-deficient-type defect of Si—Si that is expressed as the absorption band of 250 nm so as to have a desired range and by setting the OH group concentration and the viscosity to a desired range, without using the doped metals for increasing the refractive index or with significantly low concentration of doping.

That is, the synthetic silica glass of the present invention has a paramagnetic defect, namely Si•(E' center) at 215 nm. The E' center intensifies the electron density and intensifies the refractive index. The ODC defect center volume is measured by ESR, and is detected as spin density (spins/g) in the range from $1\times10^{10}$ to $1\times10^{20}$. The ESR (Electron Spin Resonance) is an analytic procedure in which when microwave is irradiated, the amount of unpaired electrons are determined by measuring the characteristic absorption in the magnetic wave that is generated when unpaired electrons (always defective) among a sample is resonated. Moreover, the defect volume of E' center as photocharacterization, appears as the absorption band of the wavelength 215 nm, and is calculated by measuring the absorption coefficient at the wavelength of 215 nm. For the synthetic silica glass of the present invention, the absorption coefficient at the wavelength of 215 nm is 0.001 $cm^{-1}$ or more and 2 $cm^{-1}$ or less. When the absorption coefficient is below 0.001 $cm^{-1}$, there is no increased effect of the refractive index, and when it exceeds 2 $cm^{-1}$, it is extremely difficult to manufacture.

Furthermore, the synthetic silica glass of the present invention has the ODC oxygen-deficient-type defect at 250 nm. The ODC defect center increases the viscosity, and the viscosity at 1.100 C. exceeds $1\times10^{14}$ poise. The amount of the oxygen-deficient-type defect is expressed as the absorption band at the wavelength of approximately 250 nm, and is calculated by measuring the absorption coefficient at the wavelength of 250 nm. For the synthetic silica glass of the present invention, the absorption coefficient at the wavelength of 250 nm is 0.001 $cm^{-1}$ or more and 2 $cm^{-1}$ or less. When the absorption coefficient is below 0.001 $cm^{-1}$, there is no increased effect of the viscosity, and when it exceeds 2 $cm^{-1}$, it is extremely difficult to manufacture.

In the present invention, the absorption coefficient k at 215 nm and 250 nm is calculated by measuring the transmittance and by using the following formula (1).

$$T=10^{-kd} \quad (1)$$

(wherein in formula (1), T represents the internal transmittance (%), and d represents the thickness (cm) of a measurement sample).

For the synthetic silica glass of the present invention, it is necessary that the viscosity at 1.100° C. is $1\times10^{13.5}$ poise or more and $1\times10^{15.5}$ poise or less. When the viscosity of the synthetic silica glass at 1.100° C. falls below $10^{13.5}$, the thermostability is poor, and for example, life of the fiber laser that is used at high temperature is shortened. On the other hand, the synthetic silica glass having high viscosity with the viscosity at 1.100° C. exceeding $10^{15.5}$, manufacturing thereof is difficult.

The OH group concentration of the synthetic silica glass of the present invention is 5 wtppm or less. When 5 wtppm or more of the OH group remains, production of ODC defect centers and E' centers decreases, and the viscosity is also reduced; therefore, it is not preferable.

Moreover, for the synthetic silica glass of the present invention, due to absorption of defects of ODC defect centers and E' centers, the internal transmittance at the wavelength of 250 nm or less falls to 70%/cm or less.

For the synthetic silica glass of the present invention, although the refractive index can be increased without using the doped metals for increasing the refractive index, it may be preferable that an extremely small amount of the doped metals is used. Specifically, for the synthetic silica glass of the present invention, the total content of the metallic elements of Group 3 and Group 13 of the periodic table is preferably 0 wtppm or more and 50.000 wtppm or less, most preferred 10.000 wtppm or less; and it is preferable that it is set to be 1 wtppm or more and 1000 wtppm or less. The metallic elements M of Group 3 and Group 13 of the periodic table that are doped to the synthetic silica glass of the present invention interact with ODC defect center, thereby generating Si•(E' center) or Si-M•, increase the electron density drastically, and even in the doping concentration in the range of 1 wtppm to 1000 wtppm, the increase of the refractive index far exceeding the dope at the percentage level in conventional silica glass can be achieved.

As the metallic element, Al is easily doped, has no quality issues for the silica glass, and is preferable. Along with Al, co-doping of rare earth elements such as Y, Nd, Sm, Yb, and Er also has the similar effects, and is preferable. However, because when the doping concentration of the metallic elements is too high, the abovementioned problems occur, for the synthetic silica glass of the present invention, the sum of the concentration of each metallic element of Group 3 and Group 13 of the periodic table is set to be 10000 wtppm or less, and preferably set to be at 1000 wtppm or less.

For the synthetic silica glass of the present invention, compared to the non-doped synthetic fused silica glass that does not virtually contain the paramagnetic defect at 215 nm and the oxygen-deficient-type defect at 250 nm, it is possible to adjust the respective refractive index in the wavelength range of 600 nm or more and 1700 nm or less, 0.03% to 3% higher in the relative refractive index difference. The synthetic silica glass of the present invention is the synthetic silica glass used for the fiber, and particularly, it is preferable that it is used as the core or the cladding of the fiber, preferably it is used for the fiber laser, and it is more preferable that it is used for the cladding of the fiber laser. For example, when the refractive index of the core increases 1% with respect to the conventional case, correspondingly, the refractive index of the cladding is also increased 1%, and the refractive index difference of the core and the cladding is adjusted such that outward diffusion of light can be prevented.

In the present invention, the relative refractive index difference Δ is calculated by the following formula (2).

$$\Delta(\%)=100\times(n_f-n_o)/n_o \quad (2)$$

In the above formula (2), Δ represents the relative refractive index difference, $n_f$ represents the refractive index of the synthetic silica glass of the present invention, and $n_o$ represents the refractive index of the non-doped fused silica glass that serves as the base.

The non-doped fused silica glass that serves as the base of the relative refractive index difference is a synthetic fused silica glass in which the absorption coefficient at 215 nm is below 0.001 $cm^{-1}$, the absorption coefficient at 250 nm is below 0.001 $cm^{-1}$, elements that affect the refractive index such as the metallic elements or elemental fluorine are not doped, and the total concentration of the metallic elements that are contained is 1 wtppm or less.

Next, a method for manufacturing the synthetic silica glass for cladding of the present invention is described. First, a porous synthetic silica glass body is prepared. The synthetic silica glass body can be obtained by known manufacturing methods such as the soot method and silica gel method, and although they are not specifically limited, the soot method is preferable.

A manufacturing method of the synthetic silica glass of the present invention is described using the soot method as an example. From the middle of a burner made of fused silica glass having a multiple tube configuration, a source gas such as SiC14 is supplied, hydrogen, or methane, and oxygen are supplied from a tube on the outer side, silica particles are obtained by flame-hydrolyzing the source gas, and those are accumulated above the target to prepare a porous synthetic silica glass body (soot body). For the porous synthetic fused silica glass body, the one containing a large quantity of a hydroxyl group is preferable. Specifically, it is preferable that the OH group inside the porous synthetic fused silica glass body is 10 wtppm or more and 5000 wtppm or less. By containing the hydroxyl group, reaction in the reduction treatment is made easy.

When the desired metallic elements are doped with the synthetic silica glass body of the present invention, it is preferable that the porous synthetic silica glass that is constituted by doping the desired metallic elements is used. Although a method for obtaining the porous synthetic silica glass that is constituted by doping the desired metallic elements is not limited, for example, it is preferable that the soot body obtained according to the above method is soaked in a aqueous solution in which compounds containing the doped metallic elements such as Al, Y, Nd, and Yb are dissolved to a desired concentration, that the metallic elements are impregnated, and that subsequently, they are taken out to dry. As other doping methods, there is a method for dispersing into the soot body in the gas phase, method for mixing and simultaneously accumulating the doped compounds in the gas phase in the process of accumulating and forming the soot body, etc.

The reduction treatment in which the porous synthetic silica glass body is heated in the atmosphere having the reducibility, preferably in the reducing atmosphere containing the volatile organic silicon compound is performed. Based on the reduction treatment, the OH group is reduced to 5 wtppm or less.

As the reduction treatment, in the atmosphere having the reducibility, it is heated to 100 to 1.300° C., preferably to 400 to 1.000° C. As the gas phase contained in the atmosphere having the reducibility, a volatile organic silicon compound, ammonia ($NH_3$), hydrazine ($N_2H_4$), ethanol ($C_2H_5OH$), carbon monoxide (CO), chlorine ($Cl_2$) silicon tetrachloride ($SiCl_4$) can be raised, and the volatile organic silicon compound is preferable. As the volatile organic silicon compound, for example, hexamethyldisilazane ($[(CH_3)_3Si]_2NH$), trichloromethylsilane (($CH_2Cl$)3SiH), hexamethyldisiloxane $[(CH_3)_3Si]_2O$, etc., can be raised.

The porous synthetic silica glass body after the reduction treatment process is heat-treated in the atmosphere containing hydrogen, at 300 to 1900° C., preferably at the temperature of 500 to 1500° C.

The synthetic silica glass body after the heat treatment in the atmosphere containing the above hydrogen is sintered at 1100 to 1900° C., preferably at the temperature of 1200 to 1800° C. and densified to manufacture a transparent silica glass body. It is preferable that the sintering treatment is performed in vacuum or in inert gas atmosphere.

For the manufacturing process of the present invention, by the sintering treatment in the atmosphere containing hydrogen, and by the subsequent sintering, for the heating and molding of the transparent silica glass body in vacuum or inert gas, reduction reaction inside the silica glass progresses and reducing defects (that is ODC defect center and E' centers) are generated.

The fiber laser preform of the present invention is the one that used the synthetic silica glass for fiber of the present invention. The fiber laser preform of the present invention uses a laser medium glass in the section corresponding to the core of the optical fiber and uses the synthetic silica glass of the present invention in the section corresponding to the cladding; moreover, for the synthetic silica glass of the present invention, it is preferable that the one with a low refractive index with respect to the refractive index of the laser medium glass for core is selected; however, the synthetic silica glass of the present invention may be used for the core or for both the core and the cladding. For the fiber laser preform of the present invention, it is preferable that the refractive index difference between the core and the cladding is set to be 0.4% to 0.6% in the relative refractive index difference $\Delta$.

As the laser medium glass, although known laser medium glass can be used, it is preferable that the silica glass doped with the rare earth elements is used, and it is more preferable that the silica glass doped with the rare earth elements and Al is used.

By performing a fiber drawing process to the fiber laser preform of the present invention, an optical fiber with high yield and with good optical amplification efficiency can be obtained.

The fiber laser device of the present invention is the one that used the synthetic silica glass of the present invention and the preform made of that. The fiber laser device of the present invention is the one comprising a fiber laser oscillator, a fiber laser amplifier, and the fiber laser used in these devices. With regard to the fiber laser device of the present invention, for the fiber laser, the basic configuration is the same as conventional fiber laser, and it is the one in which the laser medium glass is used in the section corresponding to the core of the optical fiber and the glass with a low refractive index with respect to the laser medium is used in the section corresponding to the cladding, and is the one showing the fiber-shaped laser medium. The characteristics of the fiber laser device of the present invention are such that the synthetic silica glass of the present invention is used as the cladding. As the laser medium glass, although a known laser medium glass can be used, it is preferable that the silica glass doped with the rare earth elements is used, and it is more preferable that the silica glass doped with the rare earth elements and Al is used. For the synthetic silica glass of the present invention used in the fiber laser device of the present invention, the one with a low refractive index with respect to the laser medium for core is selected.

Preferred Embodiments

Detailed explanation is provided below based on Examples. Moreover, for the physical property shown in examples below, the following measurement method was followed.
(1) Measurement of the OH group concentration; infrared absorbing method (refer to D. M. Dodd, "Optical Determinations of OH in Fused Silica", J. Appl. Phys. Vol. 37 (1966), pp. 3911).
(2) Measurement of the content of the metallic elements; atomic absorption spectrophotometry.
(3) Viscosity test; beam-bending method (refer to ASTM, C-598-72 (1983))
(4) Measurement of the absorption coefficient; ultraviolet spectrophotometry.
(5) Measurement method of internal transmittance (2-sided mirror surface 10 t); ultraviolet spectrophotometry.
(6) Measurement of refractive index; measurement of optical constant using spectroscopic ellipsometer (n: refractive index, k: extinction coefficient).

EXAMPLE 1

After soaking approximately 1 kg of a cylindrical porous synthetic silica glass body (containing approximately 300 wtppm of the OH group) with the outer diameter 100 mm×internal diameter 60 mm×length 300 mm and the density of 0.7 g/cm³, obtained through flame hydrolysis of tetrachlorosilane, into a 5 l of solution in which 1 g/l of aluminum nitrate was dissolved, it was taken out and dried for several days by placing in the atmosphere at 90° C. Subsequently, it was set inside a core tube (diameter 200 mm) made of the silica glass that is attached inside an electric furnace, and next, after inside the core tube was exhausted, it was heated to 500° C., and was preheated at this temperature for approximately 60 minutes.

Subsequently, a hexamethyldisilazane steam was supplied while diluting with $N_2$ gas, and the hexamethyldisilazane and the OH group inside the porous synthetic silica glass body were made to react. The reduction treatment with the above hexamethyldisilazane was performed at 500° C. for 10 hours. Moreover, the flow rate of $N_2$ gas was 1 mol/hr.

After completing the reduction treatment, the porous synthetic silica glass body was transferred inside the heating furnace, the temperature inside the furnace was increased to 800° C., and was maintained for 1 hour while applying $H_2$ gas at 1 mol/hr ($H_2$ volume %: 100%). Next, the pressure inside the furnace was reduced to $1\times10^{-3}$ mmHg or less, and at the same time, the temperature was increased to 1500° C., and was maintained for 1 hour. That was cooled to a room temperature, densified, and a transparent cylindrical silica glass with the outer diameter 50 mm×internal diameter 30 mm×length 300 mm was obtained.

The above transparent cylindrical silica glass was set inside the furnace in the perpendicular direction, was heated from the bottom section, and was heated and melted to the upper section of the silica glass while performing a zone heating transfer at 2.000° C., and a tube-shaped silica glass with the outer diameter 20 mm×internal diameter 12 mm×length 1000 mm was formed. Physical property of the obtained cylindrical silica glass was measured, and the results are shown in Table 1. Moreover, the refractive index of this cylindrical silica glass in the wavelength of 500 nm to 1700 nm was studied. The results are shown in FIG. 1 and Table 1. Moreover, with regard to the results of the relative refractive index difference shown in Table 1, the difference (relative refractive index difference Δ) between the refractive index of the cylindrical silica glass, which was obtained in the respective Example, at the respective wavelength in the wavelength range of 600 nm to 1700 nm and the refractive index of the tube-shaped silica glass obtained in Comparison Example 1, which is described subsequently, was calculated based on the following formula (3), and the minimum value, maximum value, and the mean value are shown.

Using the above obtained tube-shaped silica glass as the cladding, and fitting and using the silica glass rod in which 1.0 wt % of Er and 2.0 wt % of Al 2.0 wt % were doped on the inner section as the core, they were integrated through the heat treatment at 2.000° C., and a fiber base material (fiber laser preform) with the outer diameter 15 mm×core diameter 9 mm was formed. For the silica glass rod for the core that was used, the refractive index at the wavelength of 600 nm to 1700 nm was studied, and the mean value of the relative refractive index difference based on the refractive index of the tube-shaped silica glass, which was obtained in Comparison Example 1 described subsequently, in the wavelength of 600 nm to 1700 nm, are shown in Table 2. Moreover, the relative refractive index difference Δ was calculated based on the following formula (3).

$$\Delta(\%)=100\times(n_t-n_o)/n_o \quad (3)$$

wherein in the above formula (3), Δ represents the relative refractive index difference, $n_t$ represents the refractive index of the silica glass of the respective embodiment, $n_o$ represents the refractive index of the silica glass of Comparison Example 1 that serves as the basis.

Figure 2:
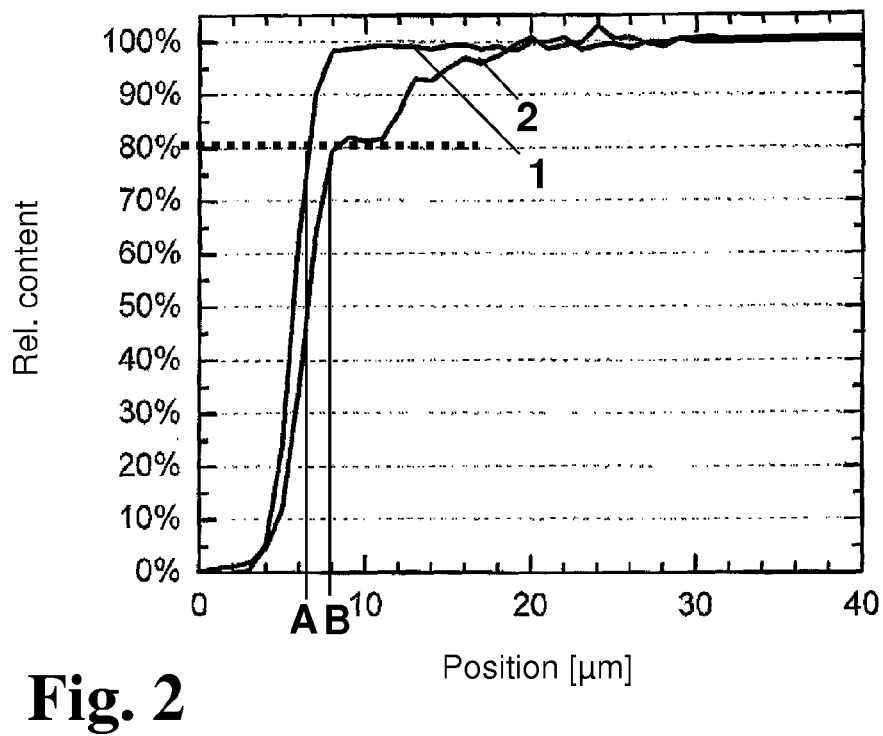
[FIG. 2] are graphs showing the refractive index distribution of the radial direction of fiber base materials of Examples 1 to 3 and Comparison Examples 1 and 2.

The physical property of the obtained fiber base material was measured. No foaming foreign substances were verified in the base material cladding section of the fiber base material, and when the refractive index distribution of the radial direction was measured, the refractive index values in the tube and core process were maintained, and when the base material cladding was used as the basis, the base material core section was 0.5% higher. The results of the refractive index at 1000 nm are shown as 1 example in FIG. 2 and Table 3.

Figure 3:
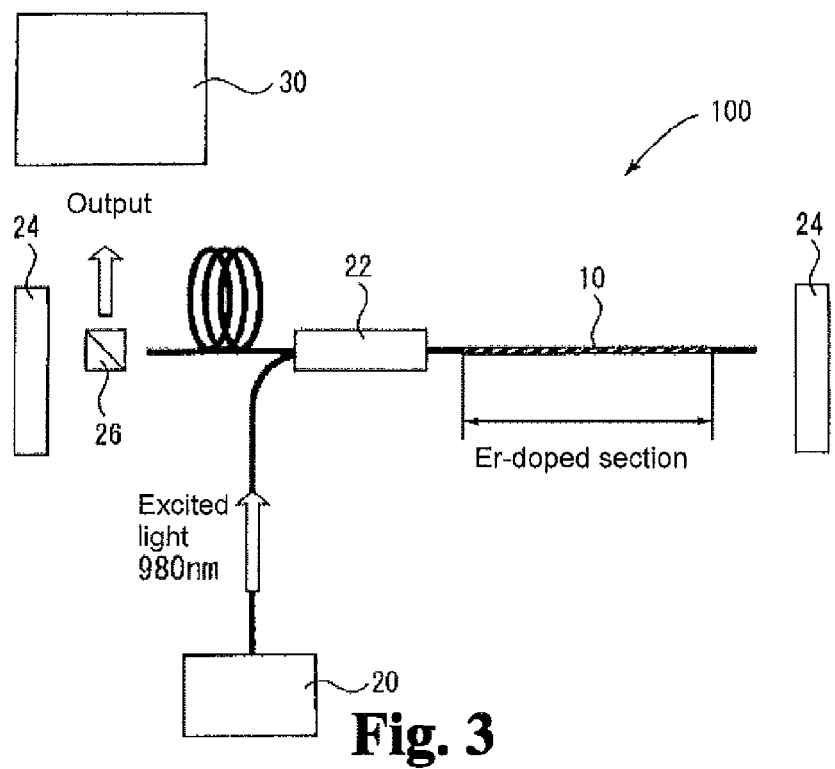
[FIG. 3] is a schematic illustration of a fiber laser device of Example 1.

Using this base material, the fiber drawing process was performed, and an Er-doped optical fiber was formed. There were no fractures and the yield exceeded 90%. The yield of the fiber after the drawing process is shown in Table 3. Using the obtained optical fiber, a fiber laser device was manufactured, and the presence or absence of amplified oscillation of the laser beam of the optical fiber was verified. FIG. 3 is a schematic illustration of the fiber laser device of Example 1. In FIG. 3, a symbol 100 represents the fiber laser device, and it is manufactured using an Er-doped optical fiber 10 that was formed previously. As shown in FIG. 3, for the source of the excited light, a laser diode (LD) 20 was used, coupling was performed with a WDM coupler 22, the light of 1550 nm was resonated with a pair of mirrors 24 and 24, and radiation was obtained with a polarization beam splitter (PBS) 26. The radiation was verified with a spectrum analyzer 30. For the obtained optical fiber 10, as the excited light, light of 980 nm was incident, and it was possible to amplify and oscillate light of 1550 nm.

EXAMPLE 2

As Example 1, except for soaking in a 5 L of solution in which 15 g/L of aluminum nitrate and 3.0 g/l of neodymium nitrate were dissolved for 10 hours, and except for fitting the silica glass rod in which 4.0 wt % of Er and 8.0 wt % of Al were doped in the core section, tests were performed in the same manner as in Example 1. The results are shown in Table 1 to 3, and FIG. 1 and FIG. 2.

EXAMPLE 3

As Example 1, except for setting the $H_2$ volume % of the $H_2$ atmosphere in the heat treatment after the reduction treatment to 3% (the balance being $N_2$), without doping anything to 1 kg of the porous silica glass body, and except for fitting the silica glass rod in which 0.5 wt % of Er and 1.0 wt % of Al were doped in the core section, tests were performed in the same manner as Example 1. The results are shown in Table 1 to 3, and FIG. 1 and FIG. 2.

Comparative Example 1

Approximately 1 kg of a cylindrical porous synthetic silica glass body (containing approximately 300 wtppm of the OH group) with the outer diameter 100 mm×internal diameter 60 mm×length 300 m and the density of 0.7 g/cm³, obtained through flame hydrolysis of tetrachlorosilane, were set inside a core tube (diameter 200 mm) made of the silica glass that is attached inside an electric furnace. Next, after inside the core tube was exhausted, it was heated to 500° C., and was preheated at this temperature for approximately 60 minutes. Subsequently, the porous synthetic silica glass body was transferred inside the heating furnace, the temperature inside the furnace was increased to 800° C., and was maintained for 1 hour while applying $N_2$ gas at 1 mol/hr. Next, the pressure inside the furnace was reduced to $1\times10^{-3}$ mmHg or less, and at the same time, the temperature was increased to 1.500° C., and was maintained for 1 hour. It was cooled to a room temperature, densified, and a transparent cylindrical silica glass with the outer diameter 100 mm×internal diameter 90 mm×length 300 mm was obtained.

The above transparent cylindrical silica glass was set inside the furnace in the perpendicular direction, was heated from the bottom section, and was heated and melted to the upper section of the silica glass while performing a zone heating transfer at 2.000° C., and a tube-shaped silica glass with the outer diameter 30 mm×internal diameter 20 mm×length 1000 mm was formed. Physical property of the obtained tube-shaped silica glass was measured in the same manner as Example 1, and the results are shown in Table 1 and FIG. 1.

Using the same core as Example 1, a base material was formed, and a fiber drawing was performed to a fiber. When the refractive index distribution was measured, difference in the refractive index between the core section and the cladding section was 0.62%, the uniform waveguide could not be obtained, and the optical amplification could not be performed.

COMPARATIVE EXAMPLE 2

In Example 1, except for soaking in a 5 L of solution in which 20 g/L of aluminum nitrate and 4.0 g/L of neodymium nitrate were dissolved for 10 hours, and except for fitting the silica glass rod in which 5.0 wt % of Er and 10.0 wt % of Al were doped in the core section, tests were performed in the same manner as Example 1. The results are shown in Table 1 to 3, and FIG. 1 and FIG. 2. Foams and foreign substances were generated in the tube-shaped silica glass, and for the fiber, fractures occurred.

TABLE 1

Physical property of the tube-shaped silica glass for cladding

| Evaluation item | Example 1 | Example 2 | Example 3 | Comp. Ex. 1 | Comp. Ex. 2 |
|---|---|---|---|---|---|
| OH group concentration (wt ppm) | 0 | 0 | 0 | 250 | 0 |
| Absorption coefficient at 250 nm ($cm^{-1}$) | 1.2 | 1.1 | 1.0 | 0 | 0.7 |
| Absorption coefficient at 215 nm ($cm^{-1}$) | 1.6 | 1.5 | 0.9 | 0 | 0.9 |
| Viscosity at 1100° C. ($\log_{10} c\eta$) | 15.2 | 14.0 | 14.6 | 13.3 | 13.9 |
| Internal transmittance of light beam at the wavelength of 250 nm or less (%/cm) | <52 | <52 | <60 | <88 | <65 |
| Doping concentration (wt ppm) | Al: 40 | Al: 600 Nd: 300 | 0 | 0 | Al: 800 Nd: 400 |
| Relative refractive index difference + Δ (%) at 600 to 1700 nm when based on Comp. Example 1 | | | | | |
| Minimum value | 0.10 | 2.71 | 0.04 | 0.00 | 3.20 |
| Maximum value | 0.15 | 2.99 | 0.12 | 0.00 | 3.41 |
| Mean value | 0.12 | 2.80 | 0.08 | 0.00 | 3.30 |

TABLE 2

Physical property of the silica glass rod for core

| Evaluation item | Example 1 | Example 2 | Example 3 | Comp. Ex. 1 | Comp. Ex. 2 |
|---|---|---|---|---|---|
| Doping concentration (wt %) | Al: 2.0 Er: 1.0 | Al: 8.0 Er: 4.0 | Al: 1.0 Er: 0.5 | Al: 2.0 Er: 1.0 | Al: 10.0 Er: 5.0 |
| Relative refractive index difference + Δ (%) at 600 to 1700 nm when based on the cladding of Comparison Example 1 Mean value | 0.62 | 3.30 | 0.58 | 0.62 | 3.80 |

TABLE 3

Physical property of the fiber base material

| Evaluation item | Example 1 | Example 2 | Example 3 | Comp. Ex. 1 | Comp. Ex. 2 |
|---|---|---|---|---|---|
| Foams/foreign substances of the base material cladding | No | No | No | No | Yes |
| Relative refractive index difference + Δ (%) of the base material core when based on the base material cladding | 0.50 | 0.50 | 0.50 | 0.62 | 0.50 |
| Yield of the fiber after fiber drawing (%) | 97 | 94 | 99 | 99 | 60 |
| Oscillation of the optical fiber | Yes | Yes | Yes | No | No |

EXPLANATION OF THE REFERENCE NUMBERS

10 Er-doped optical fiber
20 laser diode
22 WDM coupler
24 mirror
26 polarization beam splitter
30 spectrum analyzer
100 fiber laser device.

The invention claimed is:

1. An article of manufacture comprising synthetic silica glass, said synthetic silica glass having:
   paramagnetic E' defect centers in an amount sufficient that the synthetic silica glass has an absorption coefficient at 215 nm in a range from 0.001 $cm^{-1}$ to 2 $cm^{-1}$;
   paramagnetic oxygen defect centers (ODC defect centers) in an amount sufficient that the synthetic silica glass has an absorption coefficient at 250 nm in a range from 0.001 $cm^{-1}$ to 2 $cm^{-1}$;
   an OH group concentration of 5 wtppm or less;
   a viscosity at 1100° C. in a range from $1\times10^{13.5}$ poise to $1\times10^{15.5}$ poise; and
   a total content of aluminum that is in a range from 1 wtppm to 10,000 wtppm;
   wherein said synthetic silica glass has, in a wavelength range between 600 nm and 1700 nm, a relative refractive index difference that is in a range from +0.03% to +3% relative to a synthetic fused silica glass having an absorption coefficient at 215 nm less than 0.001 cm$^{-1}$, and an absorption coefficient at 250 nm of less than 0.001 cm$^{-1}$, and further comprising a core glass, and wherein said synthetic silica glass is a cladding for said core glass, said core glass and said cladding being parts of a fiber.

2. The article according to claim 1, wherein the total content of aluminum is in a range between 1 wtppm and 1,000 wtppm.

3. An article of manufacture comprising synthetic silica glass, said synthetic silica glass having:

paramagnetic E' defect centers in an amount sufficient that the synthetic silica glass has an absorption coefficient at 215 nm in a range from 0.001 cm$^{-1}$ to 2 cm$^{-1}$;

paramagnetic oxygen defect centers (ODC defect centers) in an amount sufficient that the synthetic silica glass has an absorption coefficient at 250 nm in a range from 0.001 cm$^{-1}$ to 2 cm$^{-1}$;

an OH group concentration of 5 wtppm or less;

a viscosity at 1100° C. in a range from $1\times10^{13.5}$ poise to $1\times10^{15.5}$ poise; and a total content of aluminum that is in a range from 1 wtppm to 10,000 wtppm;

wherein said synthetic silica glass has, in a wavelength range between 600 nm and 1700 nm, a relative refractive index difference that is in a range from +0.03% to +3% relative to a synthetic fused silica glass having an absorption coefficient at 215 nm less than 0.001 cm$^{-1}$, and an absorption coefficient at 250 nm of less than 0.001 cm$^{-1}$; and wherein said article is a fiber laser device.

4. An article of manufacture comprising synthetic silica glass, said synthetic silica glass having:

paramagnetic E' defect centers in an amount sufficient that the synthetic silica glass has an absorption coefficient at 215 nm in a range from 0.001 cm$^{-1}$ to 2 cm$^{-1}$;

paramagnetic oxygen defect centers (ODC defect centers) in an amount sufficient that the synthetic silica glass has an absorption coefficient at 250 nm in a range from 0.001 cm$^{-1}$ to 2 cm$^{-1}$;

an OH group concentration of 5 wtppm or less;

a viscosity at 1100° C. in a range from $1\times10^{13.5}$ poise to $1\times10^{15.5}$ poise; and a total content of aluminum that is in a range from 1 wtppm to 10,000 wtppm;

wherein said synthetic silica glass has, in a wavelength range between 600 nm and 1700 nm, a relative refractive index difference that is in a range from +0.03% to +3% relative to a synthetic fused silica glass having an absorption coefficient at 215 nm less than 0.001 cm$^{-1}$, and an absorption coefficient at 250 nm of less than 0.001 cm$^{-1}$, wherein said synthetic silica glass is a core glass, and wherein the article further comprises a cladding glass layer around said core glass, and wherein the core glass and the cladding glass layer are parts of a preform for a step-index optical fiber.

5. The article according to claim 3, wherein the total content of aluminum is in a range between 1 wtppm and 1,000 wtppm.

6. The article according to claim 4, wherein the total content of aluminum is in a range between 1 wtppm and 1,000 wtppm.

* * * * *